United States Patent [19]

Kim

[11] Patent Number: 5,669,619
[45] Date of Patent: Sep. 23, 1997

[54] PORTABLE WHEELCHAIR

[76] Inventor: Il Yoo Kim, 7945 Audubon Ave. No. A-6, Alexandria, Va. 22306

[21] Appl. No.: 542,386

[22] Filed: Oct. 12, 1995

Related U.S. Application Data

[63] Continuation-in-part of Ser. No. 517,605, Aug. 22, 1995.

[51] Int. Cl.[6] ........................................................ B60K 7/00
[52] U.S. Cl. ........................ 280/250.1; 180/6.5; 180/65.5; 180/907; 301/5.1
[58] Field of Search .................................. 180/907, 6.48, 180/6.5, 65.2, 65.5, 65.1, 220, 207, 208; 280/250.1, 304.1, 288.1; 301/1, 5.1, 6.5

[56] References Cited

U.S. PATENT DOCUMENTS

| | | |
|---|---|---|
| 970,291 | 9/1910 | Baisden . |
| 3,381,973 | 5/1968 | Carr . |
| 4,045,096 | 8/1977 | Lidov ........................................ 301/5.1 |
| 4,462,605 | 7/1984 | Morgan et al. ........................... 280/242 |
| 4,593,929 | 6/1986 | Williams ................................... 280/650 |
| 4,735,459 | 4/1988 | Massonnet ................................ 301/5.1 |
| 4,770,432 | 9/1988 | Wagner ..................................... 280/242 |
| 4,887,826 | 12/1989 | Kantner ................................... 280/250.1 |
| 5,071,196 | 12/1991 | Sbarro ...................................... 301/5 R |
| 5,261,684 | 11/1993 | Soto ......................................... 280/250.1 |
| 5,366,037 | 11/1994 | Richey ..................................... 180/65.5 |
| 5,419,619 | 5/1995 | Lew ......................................... 301/5.1 |

OTHER PUBLICATIONS

Publication: *Popular Mechanics*, Wheelchair Disclosure, Oct. 1995, p. 28.

Primary Examiner—Anne Marie Boehler
Attorney, Agent, or Firm—Aquilino & Welsh

[57] ABSTRACT

A portable wheelchair including a seat assembly having a seat and a back rest, and a footrest having at least one guiding wheel. The seat assembly and the footrest are selectively secured between a first wheel and a second wheel. The first wheel includes a first tire mounted on a first rim and the second wheel includes a second tire mounted on a second rim, wherein a first cross-brace releasably couples the seat assembly to the first wheel and a second cross-brace releasably couples the seat assembly to the second wheel. The first cross brace includes a first motor and the second cross brace includes a second motor, wherein the first motor and the second motor are respectively coupled to the first wheel and the second wheel to facilitate movement of the wheelchair.

20 Claims, 4 Drawing Sheets

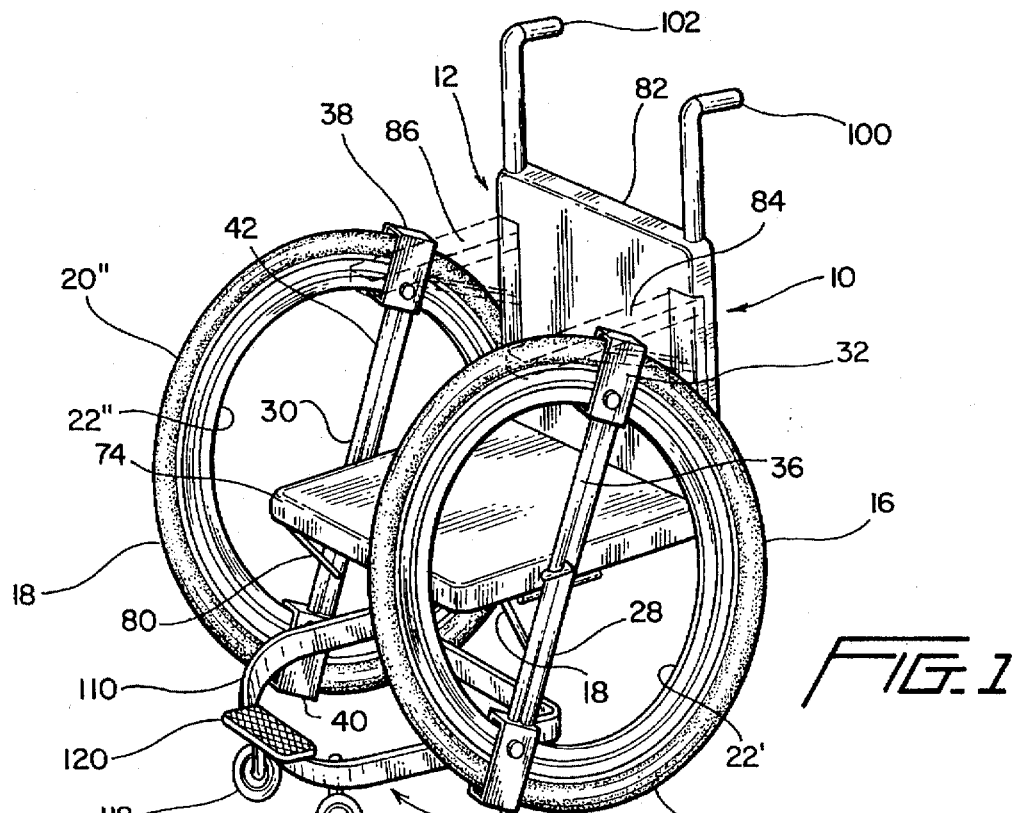
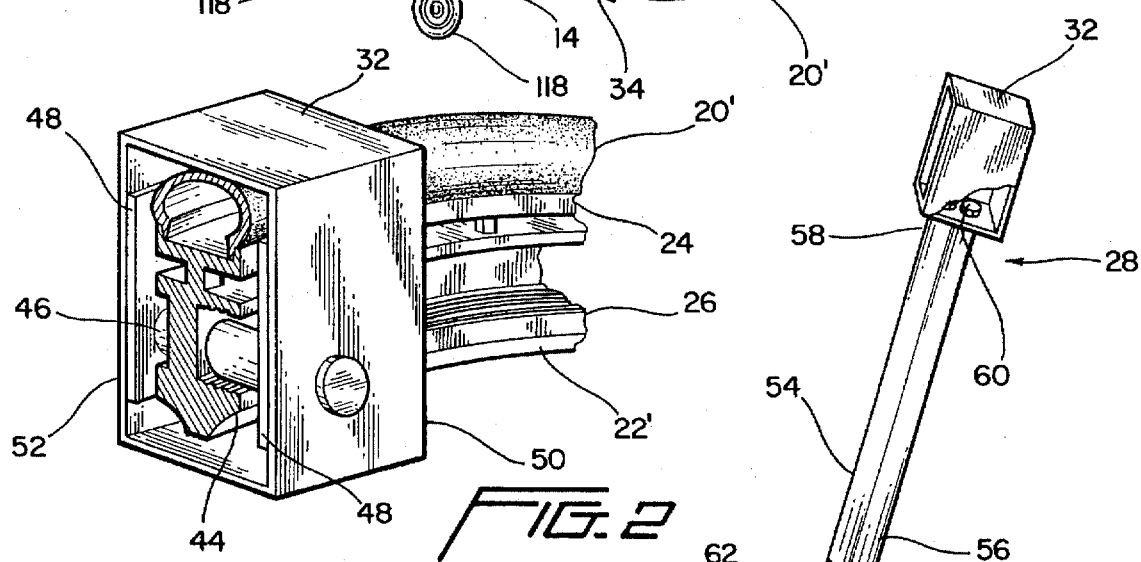
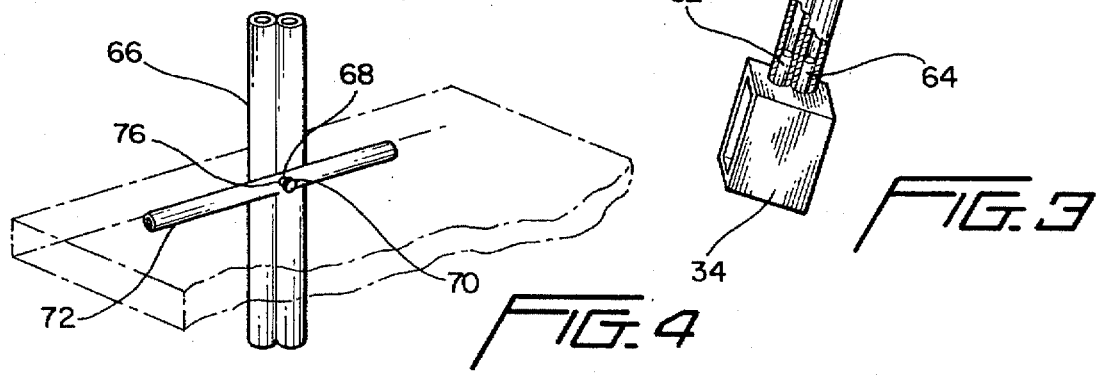

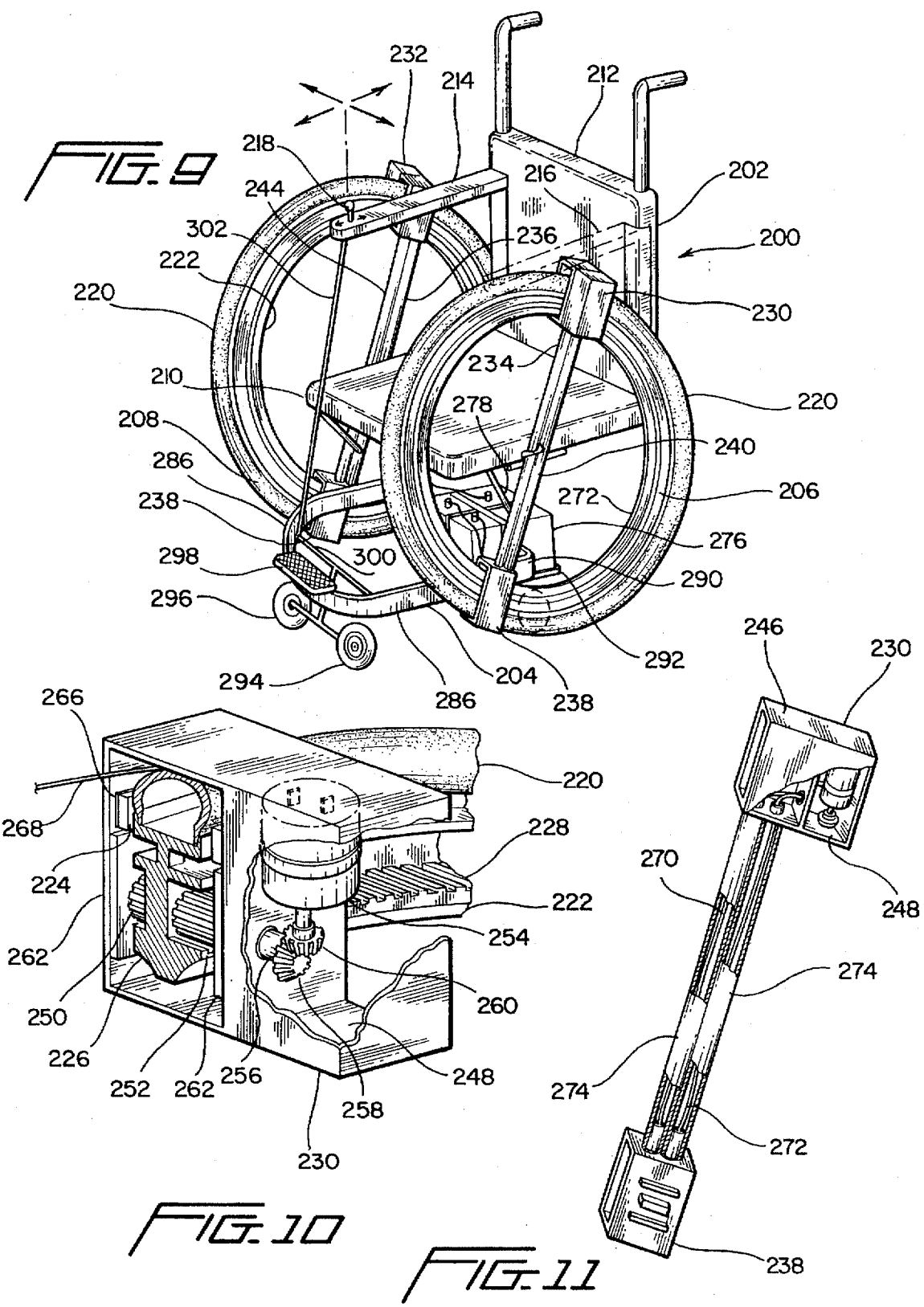

5,669,619

PORTABLE WHEELCHAIR

RELATED APPLICATIONS

This is a continuation-in-part of pending U.S. patent application Ser. No. 08/517,605 file Aug. 22, 1995. The Application was filed by Il Yoo Kim and is entitled "Portable Wheelchair".

BACKGROUND OF THE INVENTION

1. Field of the Invention

The invention relates to a wheelchairs. More particularly, the invention relates to portable wheelchairs adapted for simple assembly and disassembly.

2. Description of the Prior Art

Conventional wheelchairs generally include a seat, a backrest, and a footrest rigidly secured to a pair of wheels. These wheelchairs are collapsed by pushing the wheels toward each other while the seat, backrest, and footrest collapse to the extent they are able to. As is well known to individuals familiar with these wheelchairs, they are generally, very cumbersome to transport or store, even when they are in their collapsed state.

Recent advances in design techniques and materials has made the development of lightweight, portable wheelchairs possible. The recent development of lightweight, portable wheelchairs has been met with great anticipation by individuals confined to wheelchairs, who had to previously deal with the limitations of heavier, more cumbersome wheelchairs.

However, recent developments in lightweight wheelchairs have produced relatively complex wheelchairs, which are not as easy to use as most individuals would like. For example, U.S. Pat. No. 5,261,684, to Soto, discloses a portable, lightweight wheelchair. The wheelchair includes a seat and footrest secured between a pair of spokeless wheels. The wheelchair is stored by disassembling the wheels, seat and footrest. The disassembly and assembly process is, however, complicated, and relies upon a variety of complex connections to retain the wheelchair in its assembled configuration.

Consequently a need continues to exist for a lightweight, portable wheelchair that may be readily assembled and disassembled. The present invention provides such a wheelchair.

SUMMARY OF THE INVENTION

It is, therefore, an object of the present invention to provide a portable wheelchair. The wheelchair includes a seat assembly having a seat and a back rest, and a footrest having at least one guiding wheel. The seat assembly and the footrest are selectively secured between a first wheel and a second wheel. The first wheel includes a first tire mounted on a first rim and the second wheel includes a second tire mounted on a second rim, wherein a first cross-brace releasably couples the seat assembly to the first wheel and a second cross-brace releasably couples the seat assembly to the second wheel. The first cross brace includes a first motor and the second cross brace includes a second motor, wherein the first motor and the second motor are respectively coupled to the first wheel and the second wheel to facilitate movement of the wheelchair.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a perspective view of the present wheelchair.

FIG. 2 is a detailed view of the bearing assembly.

FIG. 3 is a partial cross-sectional view of the cross-brace.

FIG. 4 is a top view of the seat assembly connected to the second cross-brace.

FIG. 9 is a perspective view of an alternate embodiment of the present invention.

FIG. 10 is a partial cross sectional view of the bearing assembly used in conjunction with the embodiment shown in FIG. 9.

FIG. 11 is a partial cross sectional view of the cross brace used in conjunction with the embodiment shown in FIG. 9.

DESCRIPTION OF THE PREFERRED EMBODIMENTS

Figures 5, 6:
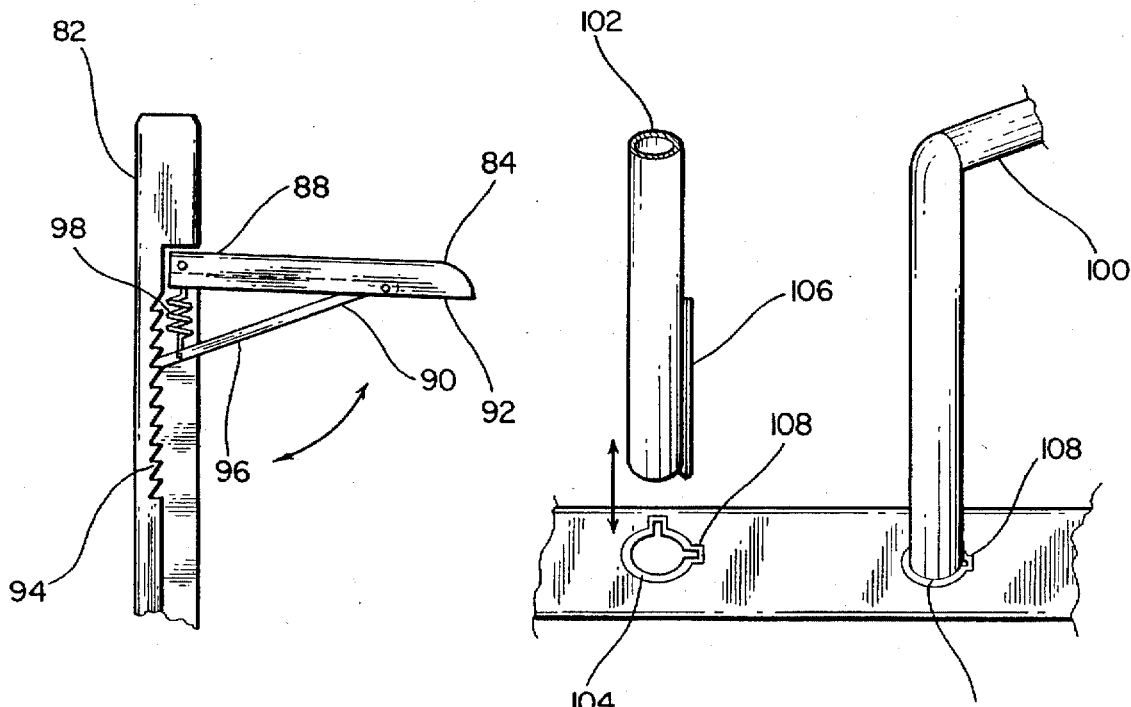
FIG. 5 is a side view of the backrest showing the operation of the armrest.
FIG. 6 is a top view of the backrest.

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIG. 1, a portable wheelchair 10 is disclosed. The wheelchair includes a seat assembly 12 and a footrest assembly 14 positioned between a first wheel 16 and a second wheel 18. Each wheel includes a tire 20 mounted on a spokeless rim 22. The rim 20 includes an outer groove 24 designed to retain the bead of the tire 18 and an inner bearing surface 26. Each rim 22 may further include an opening (not shown) permitting inflation of the tire. A cross-brace 28, 30 is secured across each wheel.

With regard to the first wheel 16, the first cross-brace 28 is coupled to the first wheel 16 by a first bearing assembly 32 slidably mounted to the first rim $22^1$ and a second bearing assembly 34 slidably mounted to the opposite side of the first rim $22^1$, wherein the first bearing assembly 32 and the second bearing assembly 34 are connected by a first spoke member 36. Similarly, the second cross-brace 30 is coupled to the second wheel 18 by a first bearing assembly 38 slidably mounted to the second rim $22^{11}$ and a second bearing assembly 40 slidably mounted to the opposite side of the second rim $22^{11}$, wherein the first bearing assembly 38 and the second bearing assembly 40 are connected by a second spoke member 42.

The detailed construction of the first bearing assembly 32 of the first wheel 16 is shown in FIG. 2. It should be understood that all of the bearing assemblies are constructed the same, with the exception of spoke connection details that will be discussed below, and this disclosure of the first bearing assembly of the first wheel is applicable to the remaining bearing assemblies. The bearing assembly 32 is rectangular shaped and extends around a portion of the tire $20^1$ and the rim $22^1$. The bearing assembly 32 includes first and second bearing pins 44, 46 which extend toward the middle of the bearing assembly 32 and engage the bearing surface 26 of the rim 22¹. The bearing assembly 32 further includes a pair of bearing plates 48 positioned on the side walls 50, 52 of the assembly. The bearing plates 50, 52 act to maintain the rim 22¹ within the center of the bearing assembly 32.

As shown in FIG. 3, the first spoke member 36 is constructed from a pair of aluminum tubular members. It should be understood that FIG. 3 shows the first cross-brace 28 for the first wheel 16 in detail, however, the second cross-brace 30 for the second wheel 18 is identical in structure and function. The first and second tubular members 54, 56 are releasably attached to the first bearing assembly 32 and the second bearing assembly 34 of the first wheel 16.

Specifically, the first bearing assembly 32 includes first and second openings 58, 60 sized to respectively receive the upper ends of the first and second tubular members 54, 56, while the second bearing assembly 34 includes first and second detentes 62, 64 sized to fictionally receive the lower ends of the first and second tubular members 54, 56. In use, the upper ends of the first and second tubular members 54, 56 are respectively passed into the first and second openings 58, 60 of the first bearing assembly 32. The first and second tubular members 54, 56 are pushed sufficiently within the openings 58, 60 to permit the lower ends of the first and second tubular members 54, 56 above the first and second detentes 62, 64. The first and second detentes 62, 64 are then respectively forced within the first and second tubular members 54, 56 until the first and second tubular member 54, 56 are frictionally held in position.

With reference to FIG. 4, the first tubular member 66 of the second cross-brace 30 of the second wheel 18 includes a first projection 68 with a quick release compression fastener 70. Although not shown, the first cross-brace 28 includes a similar projection and quick release fastener secured to the first tubular member 54 of the first cross-brace 28. The quick release compression fasteners are preferably of the type commonly used to secure bicycle tires to the bicycle frame, although other fasteners could be used without departing from the spirit of the present invention. The projections are used to securely attach the seat assembly between the wheels in a manner that will be discussed in more detail below.

The seat assembly 12 is releasably coupled between the first and second wheels 16, 18. With reference to FIG. 4, the attachment of the second cross-brace 30 to the seat assembly 12 is disclosed. It should be understood that the first cross-brace 28 is secured to the seat assembly 12 in the same manner. The seat assembly 12 includes a pair of downwardly extending brackets 72 (only the bracket adjacent the second cross-brace is shown) secured to the bottom of the seat 74. The bracket 72 includes an opening 76 sized to receive the first projection 68. Once the first projection 68 is properly positioned within the first bracket opening 76 the quick release pressure fastener 70 is twisted to securely attach the seat assembly 12 to the second wheel 18. The first wheel 16 is attached in the same manner.

The stability of the seat assembly 12 attachment to the first and second wheels is further enhanced by first and second support members 78, 80 which extend from the bottom of the seat 74. Specifically, the first support member 78 is pivotally secured to one side of the seat 74 while the second support member 80 is pivotally secured to the other side of the seat 74. The unattached ends of the first and second support members 78, 80 respectively engage notches (not shown) in the cross-braces 28, 30 to support the seat assembly 12 relative to the first and second wheels 16, 18.

As to the structure of the seat assembly 12, it includes a seat 74 and a backrest 82. Preferably, the seat 74 and the backrest 82 are hingedly connected so that the seat assembly 12 can be folded into a compact package when the wheelchair 10 is disassembled. The backrest 82 includes a pair of armrests 84, 86 on opposite sides of the backrest 82. The armrests 84, 86 are pivotally secure to the backrest 82 and may be selectively folded down when an individual desires. The operation of the armrests 84, 86 is shown in greater detail in FIG. 5. Specifically, the upper end 88 of each armrest is pivotally secured to the backrest 82. Each armrest includes a support bracket 90 pivotally mounted at a central portion on the underside 92 of the armrest, while the backrest 82 includes a series of notches 94 adapted to receive the unattached end 94 of the support bracket 90. When an individual desires to place the armrest in a useable orientation, he or she simply rotates the armrest upward and places the unattached end 96 of the support bracket 90 within a notch 94. The support bracket 90 includes a spring 98 secured at its distal end. The spring 98 aids in securely positioning the distal end of the support bracket 98 within a notch. This provides a well supported armrest that can readily be rotated to a storage position when an individual desires.

The backrest 82 also supports first and second push handles 100, 102. The push handles are secured to opposite side of the backrest 82. The push handles are secured to the backrest so that they are fully retractable. With reference to FIG. 6, the push handles 100, 102 are stored within openings 104 formed in the backrest 82 of the seat assembly 12. When an individual desires to retract the push handles 100, 102 for use, he or she simply pulls the push handles 100, 102 from within the openings 104. Once the push handles 100, 102 are properly withdrawn, they are rotated such that detentes 106 move from alignment with slots 108 respectively positioned adjacent the openings 104. Similarly, the push handles 100, 102 are pushed back within the openings 104 by rotating the handles until the detentes 106 are aligned with the slots 108. Once the detentes 106 are aligned with the slots 108, the push handles 100, 102 will readily slide within the openings.

Figure 7:
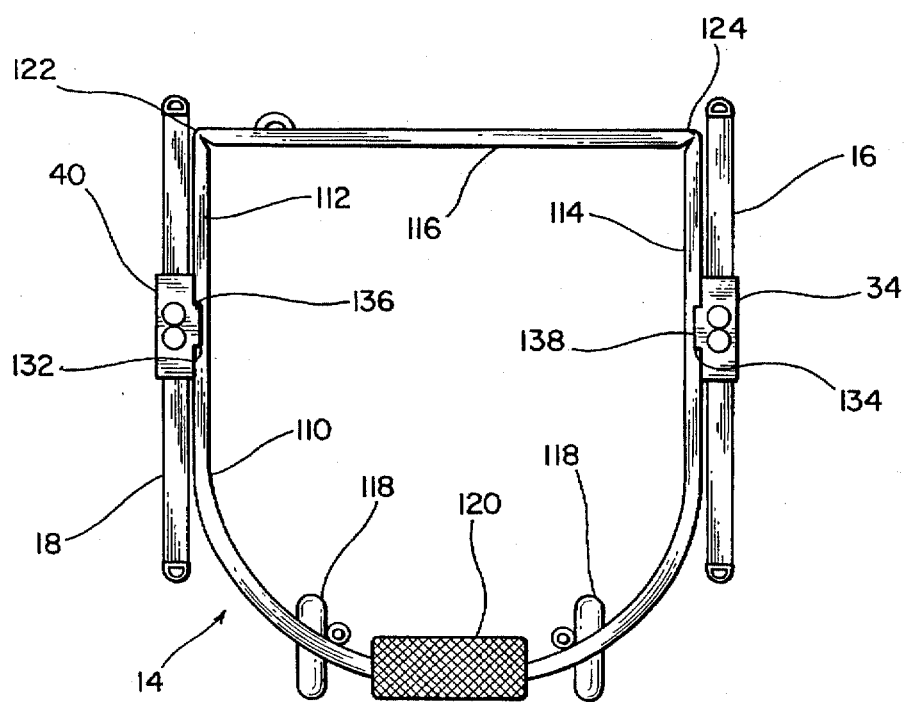
FIG. 7 is a top view showing the detailed construction of the footrest as attached to the cross-braces.

The footrest assembly 14 is shown in FIG. 7, and includes a U-shaped support member 110 having a pair of arms 112, 114 connected by a central portion 116. Guide wheels 118 are respectively secured adjacent the distal ends of the arms 112, 114. The guide wheels 118 are conventional caster wheels and are designed to permit a wide range of motion. Additionally, a footpad 120 is secured to the distal ends of the arms 112, 114 in a manner that will be discussed in greater detail.

As shown in FIG. 7, each arm includes an opening used for attaching the footrest assembly 14 to the first wheel 16 and the second wheel 18 in a manner that will be discussed in greater detail below. The footrest 14 includes a first hinge 122 located where the first arm 112 meets the central portion 116 and a second hinge 124 where the second arm 114 meets the central portion 116. The first hinge 122 is designed to permit the first arm 112 to rotate clockwise when viewed from above and the second hinge 124 is designed to permit the second arm 114 to rotate clockwise when viewed from above. The arrangement of the hinges permits the footrest 14 to be folded in the most efficient manner.

Figure 8:
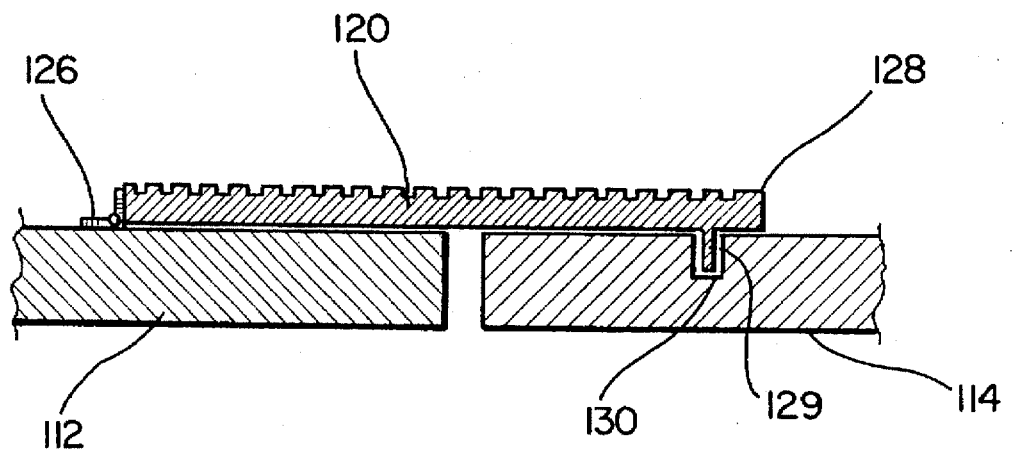
FIG. 8 is a front cross-sectional of the footrest showing the connection of the arms in detail.

As mentioned above, a footpad 120 is secured to the distal end of the first and second arms 112, 114. As shown in FIG. 8, the footpad 120 is pivotally secured to the first arm 112 and releasably secured to the second arm 114. Consequently, the footpad 120 connects the distal ends of the arms 112, 114 when the footrest 14 is in use, but permits the arms 112, 114 to be folded when the footrest 14 is no longer needed. Specifically, a hinge 126 connects the footpad 120 to the first arm 112, while the distal end 128 of the footpad 126 includes a projection 129 which releasably engages an opening 130 in the distal end of the second arm 114.

The footrest assembly 14 is releasably connected to the second bearing assembly 34 of the first wheel 16 and the second bearing assembly 40 of the second wheel 18 by respectively placing projections 132, 134 of the second bearing assemblies 34, 40 within the openings 136, 138 formed in the arms 112, 114 of the footrest assembly. The projections 132, 134 are placed within the openings 136, 138 before the pressure fasteners 70 are twisted to secure the seat assembly 12 to the first and second wheels 16, 18. Consequently, when the pressure fasteners 70 are twisted to draw the first and second wheels 16, 18 securely toward the seat assembly 12, they also draw the projections 132, 134 securely within the openings 136, 138 of the footrest assembly 14 to releasably attach the footrest assembly 14 between the first and second wheels 16, 18.

When a user determines that he or she is through using the wheelchair and desires to store it in a compact space, the user simply disengages the seat assembly from the first wheel and the second wheel by releasing the pressure fasteners. This also results in the removal of the footrest assembly from between the first and second wheels. Once the seat assembly is removed the push handle are placed in their stored position within the openings found in the backrest, and the backrest and seat are folded toward each other. Similarly, the footrest assembly is folded along the first and second hinges. The spokes may also be detached. Once everything is disassembled the seat assembly, footrest assembly, and spokes may be positioned within the wheel openings for compact storage of the wheelchair. The disassembly steps are simply reversed when an individual once again requires the use of the wheelchair.

With the exception of the aluminum tubular members, the tires and the rims, all of the components of the present can be manufactured from high strength, lightweight plastic. As a result, the present wheelchair is fully portable and weighs only approximately 14 pounds. It should, however, be understood that are wide range of materials could be used without departing from the spirit of the present invention.

An alternate embodiment of the present invention is shown in FIGS. 9–11. The wheelchair 200 is designed with automated controls for individuals who are unable to control the movement of the wheelchair. The wheelchair 200 is substantially the same as the wheelchair previously disclosed and includes a seat assembly 202 and a footrest assembly 204 positioned between a pair of wheels 206, 208. As with the prior embodiment, the wheels are releasably secure to the seat assembly and the footrest assembly.

The seat assembly 202 includes a seat 210 and a backrest 212. Armrests 214, 216 are pivotally secured to the backrest 212 permitting selective retraction of the armrests 214, 216. The right armrest 216 includes a control cursor 218 for controlling the movement of the wheelchair 200 in a manner that will be subsequently discussed. Although the left armrest 214 is disclosed without a control cursor, the left armrest 214 could be provided with a control cursor if more elaborate movement control is desired.

Each wheel includes a tire 220 mounted on a spokeless rim 222. The rim 222 includes an outer groove 224 designed to retain the bead of the tire 220 and an inner bearing surface 226. The inner bearing surface 226 includes gearing 228 for engagement with a rotating gearing housed within the first bearing assemblies 230, 232 of the first and second wheels 206, 208. As with the prior embodiment, each wheel includes a cross-brace 234, 236 secured across the diameter of the wheel.

With regard to the first wheel 206, the first cross-brace 234 is coupled to the first wheel 206 by a first bearing assembly 230 slidably mounted to the first rim 222' and a second bearing assembly 238 slidably mounted to the opposite side of the first rim 222', wherein the first bearing assembly 230 and the second bearing assembly 238 are connected by a first spoke member 240. Similarly, the second cross-brace 236 is coupled to the second wheel 208 by a first bearing assembly 232 slidably mounted to the second rim 222" and a second bearing assembly 242 slidably mounted to the opposite side of the second rim 222", wherein the first bearing assembly 232 and the second bearing assembly 242 are connected by a second spoke member 244. The second bearing assemblies of the first and second wheels are constructed in the same manner as the bearing assemblies disclosed in FIGS. 2 and 3.

The detailed construction of the first bearing assembly 230 of the first wheel 206 is shown in FIGS. 10 and 11. It should be understood that the first bearing assembly 232 of the second wheel 208 is constructed in the same manner as the first bearing assembly 230 of the first wheel 206, and this disclosure of the first bearing assembly of the first wheel should be considered a disclosure of the first bearing assembly of the second wheel. The bearing assembly is rectangular shaped and includes first and second housings 246, 248. The first housing 246 extends around a portion of the tire and the rim. The bearing assembly includes first and second gears 250, 252 engaging the gearing 228 on the inner bearing surface 226 of the rim 222'. Power is imparted to the first and second gears by the motor 254 housed within the second housing 248. Power from the motor 254 is transmitted to the first and second gears 250, 252 via a shaft 256, a shaft gear 258 and a motor gear 260. Actuation of the motors contained within the first bearing assemblies of the first and second wheels is achieved by manipulating the control cursor 218 in a manner that will subsequently be discussed.

The first housing 246 of the bearing assembly further includes a pair of bearing plates 262 positioned on the interior side walls 264 of the first housing 246. The bearing plates 262 act to maintain the rim 222 within the center of the bearing assembly 230. The bearing assembly 230 also includes brakes 266 positioned on opposite sides of the outer surface of the outer groove 224. The brakes 266 are conventional caliper brakes that are actuated via the control cursor 218. Specifically, the caliper brakes 266 are connected to the control cursor 218 via a cable 268, such that when the control cursor 218 is moved rearwardly the brakes 266 are actuated in much the same way the brakes on a bicycle are actuated when an individual pulls on the brake handle conventionally found on a bicycle.

As shown in FIG. 11, each spoke member 240, 244 is constructed from a pair of aluminum tubular members 270, 272. It should be understood that FIG. 3 shows the first cross-brace 234 for the first wheel 206 in detail, however, the second cross-brace 236 for the second wheel 208 is identical in structure and function. The first and second tubular members 270, 272 are releasably attached to the first bearing assembly 230 and the second bearing assembly 242 of the first wheel 206 in the same manner discussed above with regard to the embodiment shown in FIGS. 1–8.

Figure 12:
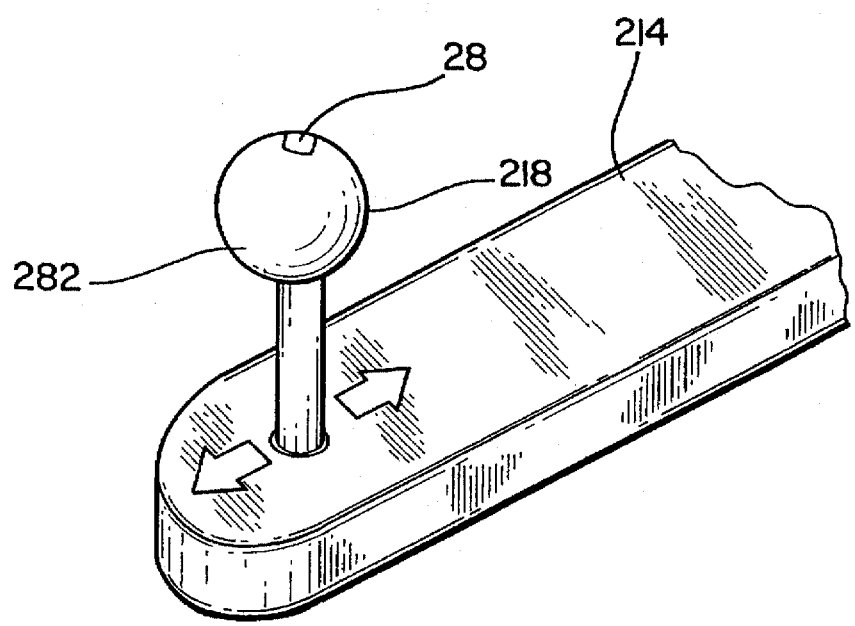
FIG. 12 is a perspective view of the control cursor.

As shown in FIG. 11, the tubular members, the detentes, and other structures are hollow permitting wiring 274 to pass therethrough. The wiring extends through the structure of the wheelchair 200 to a pair of electric batteries 276, 278 supported on the footrest assembly 204. Upon actuation of the control cursor 218 electricity is transmitted to the motors 254 via wiring 274 passing through the structure of the wheelchair 200. Specifically, the control cursor 200 includes a switch 280 located on the handle portion 282 thereof (see FIG. 12). Consequently, when the switch 280 is actuated by pressing down, a contact (not shown) is triggered causing the batteries to trasmit electricity to the motors via the internal wiring found in the wheelchair. It should be understood that a variety of control mechanisms for the flow of electricity could be used without departing from the spirit of present invention.

The footrest assembly 204 includes a U-shaped support member 284 having a pair of arms 286, 288 connected by a central portion 290. The central portion 290 includes a support pad 292 upon which first and second batteries 276, 278 are supported. The support pad 292 is hinged in the middle to permit folding of the footrest assembly 204. Guide wheels 294, 296 are respectively secured adjacent the distal ends of the arms 286, 288. The guide wheels are conventional caster wheels and are designed to permit a wide range of motion. Additionally, a footpad 298 is secured to the distal ends of the arms 286, 288 in the manner previously discussed with regard to the embodiment shown in FIGS. 1–8.

The guide wheels 294, 296 are connected by a control rod 300. The control rod 300 is positioned between the guide wheels 294, 296 permitting the orientation of the guidewheels to be controlled by a steering rod 302. The steering rod 302 is secured to the control cursor 218 such that as the control cursor 218 is moved laterally the control rod 300 causes the guide wheels 294, 296 to move in the appropriate direction. The steering rod 302 is releasable connected to the control cursor 218 and the control rod 300 to permit the disassembly of the wheelchair 200 in the manner previously discussed with regard to the first embodiment.

With the exception of the control rod 300 and the support pad 292, the footrest assembly 204 is the same as that disclosed with regard to the embodiment previously discussed and shown in FIGS. 7 and 8.

While the preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A portable wheelchair, comprising:
   a seat assembly including a seat and a back rest;
   a footrest including at least one guiding wheel;
   the seat assembly and the footrest are selectively secured between a first wheel and a second wheel, the first wheel including a first tire mounted on a first rim and the second wheel including a second tire mounted on a second rim, wherein a first cross brace extends between a first portion of the first rim and a second portion of the first rim and releasably couples the seat assembly to the first wheel and a second cross brace extends between a first portion of the second rim and a second portion of the second rim and releasably couples the seat assembly to the second wheel; and
   the first cross brace includes a first motor and the second cross brace includes a second motor, wherein the first motor and the second motor are respectively coupled to the first wheel and the second wheel to facilitate movement of the wheelchair.

2. The portable wheelchair according to claim 1, wherein the first cross brace is coupled to the first wheel by a first mounting bracket coupled to a first rim of the first wheel and a second mounting bracket coupled to the first rim of the first wheel, and wherein the first mounting bracket and the second mounting bracket are connected by a first spoke member; and the second cross brace is coupled to the second wheel by a third mounting bracket coupled to a second rim of the second wheel and a fourth mounting bracket coupled to the second rim, wherein the third mounting bracket and the fourth mounting bracket are connected by a second spoke member.

3. The portable wheelchair according to claim 2, wherein a first brake is mounted within the first mounting bracket of the first cross brace and a second brake is mounted within the fourth mounting bracket of the second cross brace.

4. The portable wheelchair according to claim 2, wherein the first motor is housed within the first mounting bracket of the first cross brace and the second motor is housed within the third mounting bracket of the second cross brace.

5. The portable wheelchair according to claim 4, wherein the first motor is coupled to gears which engage the first rim and the second motor is coupled to gears which engage the second rim.

6. The portable wheelchair according to claim 4, wherein a first brake is mounted within the first mounting bracket of the first cross brace and a second brake is mounted within the fourth mounting bracket of the second cross brace.

7. The portable wheelchair according to claim 1, wherein the first motor and the second motor are powered by at least one battery.

8. The portable wheelchair according to claim 7, wherein the first motor and the second motor are powered by first and second batteries.

9. The portable wheelchair according to claim 1, wherein the at least one battery is supported on the footrest.

10. The portable wheelchair according to claim 1, further including a control cursor for controlling the movement of the wheelchair.

11. A portable wheelchair, comprising:
    a seat means for supporting and individual;
    a footrest means for supporting an individual, the footrest means including at least one guiding wheel;
    the seat means and the footrest means selectively secured between a first wheel and a second wheel, wherein first connecting means are provided for releasably connecting the seat means to the first wheel and second connecting means are provided for releasably connecting the seat means to the second wheel, the first connecting means including a first cross brace coupled to the first wheel between a first portion of the first wheel and a second portion of the first wheel and the second connecting means including a second cross brace coupled to the second wheel between a first portion of the second wheel and a second portion of the second wheel;
    footrest connecting means for releasably connecting the footrest means between the first and second wheels; and
    first motor means coupled to the first wheel and second motor means coupled to the second wheel for facilitating movement of the wheelchair.

12. The portable wheelchair according to claim 11, wherein the first cross brace is coupled to the first wheel by a first mounting bracket coupled to a first rim of the first wheel and a second mounting bracket coupled to the first rim of the first wheel, and wherein the first mounting bracket and the second mounting bracket are connected by a first spoke member; and the second cross brace is coupled to the second wheel by a third mounting bracket coupled to a second rim of the second wheel and a fourth mounting bracket coupled to the second rim, and wherein the third mounting bracket and the fourth mounting bracket are connected by a second spoke member.

13. The portable wheelchair according to claim 12, wherein a first brake is mounted within the first mounting bracket of the first cross brace and a second brake is mounted within the fourth mounting bracket of the second cross brace.

14. The portable wheelchair according to claim 12, wherein the first motor means is housed within the first mounting bracket of the first cross brace and the second motor means is housed within the third mounting bracket of the second cross brace.

15. The portable wheelchair according to claim 14, wherein the first motor means is coupled to gears which engage the first rim and the second motor means is coupled to gears which engage the second rim.

16. The portable wheelchair according to claim 14, wherein a first brake is mounted within the first mounting bracket of the first cross brace and a second brake is mounted within the fourth mounting bracket of the second cross brace.

17. The portable wheelchair according to claim 11, wherein the first motor means and the second motor means are powered by at least one battery.

18. The portable wheelchair according to claim 17, wherein the first motor means and the second motor means are powered by first and second batteries.

19. The portable wheelchair according to claim 11, wherein the at least one battery is supported on the footrest.

20. The portable wheelchair according to claim 11, further including a control cursor for controlling the movement of the wheelchair.

\* \* \* \* \*